United States Patent [19]

Mifflin

[11] Patent Number: 5,154,736
[45] Date of Patent: Oct. 13, 1992

[54] PROCESS FOR THE SEPARATION OF A GAS MIXTURE

[75] Inventor: Thomas R. Mifflin, Houston, Tex.

[73] Assignee: Shell Oil Company, Houston, Tex.

[21] Appl. No.: 677,050

[22] Filed: Mar. 29, 1991

[51] Int. Cl.$^5$ .............................................. B01D 53/04
[52] U.S. Cl. ........................................... 55/26; 55/62; 55/68; 55/74; 55/75
[58] Field of Search ................... 55/25, 26, 58, 62, 68, 55/74, 75

[56] References Cited

U.S. PATENT DOCUMENTS

| | | | |
|---|---|---|---|
| 3,142,547 | 7/1964 | Marsh et al. | 55/26 |
| 3,430,418 | 3/1969 | Wagner | 55/25 |
| 3,564,816 | 2/1971 | Batta | 55/26 |
| 3,788,036 | 1/1974 | Lee et al. | 55/25 |
| 3,810,975 | 5/1974 | Brooke | 423/652 |
| 3,986,849 | 10/1976 | Fuderer et al. | 55/25 |
| 4,077,779 | 3/1978 | Sircar et al. | 55/25 |
| 4,160,651 | 7/1979 | Pivard | 55/26 |
| 4,263,018 | 4/1981 | McCombs et al. | 55/25 X |
| 4,468,237 | 8/1984 | Fuderer | 55/26 |
| 4,482,361 | 11/1984 | Whysall | 55/26 |
| 4,512,779 | 4/1985 | Hay | 55/62 X |
| 4,726,816 | 2/1988 | Fuderer | 55/26 |
| 4,732,596 | 3/1988 | Nicholas et al. | 55/26 X |
| 4,816,039 | 3/1989 | Krishnamurthy et al. | 55/26 |
| 4,836,833 | 6/1989 | Nicholas et al. | 55/26 X |
| 4,846,851 | 7/1989 | Guro et al. | 55/26 |
| 4,861,351 | 8/1989 | Nicholas et al. | 55/26 X |
| 4,869,894 | 9/1989 | Wang et al. | 55/26 X |
| 4,915,711 | 4/1990 | Kumar | 55/62 X |
| 4,963,339 | 10/1990 | Krishnamurthy et al. | 55/26 X |
| 5,042,995 | 8/1991 | Mitariten | 55/26 |

FOREIGN PATENT DOCUMENTS

| | | | |
|---|---|---|---|
| 0367618 | 5/1990 | European Pat. Off. | 55/25 |
| 2911669A | 10/1980 | Fed. Rep. of Germany | |

OTHER PUBLICATIONS

Kirk-Othmer's Encyclopedia of Chemical Techology, Wiley, New York, 3rd Ed. 1978, vol. 12, p. 951 ff.

*Primary Examiner*—Robert Spitzer

[57] ABSTRACT

A pressure swing adsorption process, which involves storing part of the residue gas obtained from the desorption of an adsorption zone in a residue gas vessel and venting part of the residue gas or withdrawing part of the residue gas with a compressor to enable a further decrease of the pressure in the adsorption zone in question, provides an improved efficiency as to the recovery of the product gas and allows for further use of the stored residue gas. The process is particularly suitable for employment in the production of hydrogen from the steam reforming of hydrocarbonaceous feedstocks and the subsequent purification of the crude hydrogen thus produced by the improved pressure swing adsorption process.

7 Claims, 1 Drawing Sheet

PROCESS FOR THE SEPARATION OF A GAS MIXTURE

FIELD OF THE INVENTION

The present invention relates to a process for the separation of one or more gas components from a gas mixture by pressure swing adsorption. More in particular it relates to a process for the manufacture of hydrogen in which a methane-containing feedstock is subjected to a steam reforming reaction and the crude hydrogen thus produced is purified in a pressure swing adsorption process.

BACKGROUND OF THE INVENTION

Pressure swing adsorption processes are well-known for the separation of gas mixtures that contain components with different adsorbing characteristics. In such processes the gas mixture is subjected to adsorption in an adsorption zone containing adsorbent at an elevated adsorption pressure and the thus loaded adsorbent is subsequently freed from the adsorbed gas components by depressurizing the adsorption zone to a lower desorption pressure, thereby achieving a desorption of said components. The adsorption zone, thus regenerated is repressured again and the adsorption can be resumed. To ensure a steady flow of purified gas a number of adsorption zones are used. An issue that arises during the desorption relates to the gas that is withdrawn from the adsorption zone in the desorption stage. This gas may have a composition similar to the gas mixture to be treated and may therefore be valuable. Such gas is therefore generally not vented, but is used to repressure another adsorption zone that has been previously reduced in pressure to the desorption pressure. After such use there may still be a relatively large amount of valuable gas left. A solution could be to recover this gas in a so-called residue gas vessel, by equalizing the pressures in the adsorption zone and the residue gas vessel. It will be evident that due to the equalization of these pressures the prevailing pressure in the residue gas vessel may amount up to a significant superatmospheric value.

The prior art has recognized the problem of re-using the gas contained in the adsorption zone before depressuring. In U.S. Pat. No. 3,142,547 it is proposed to allow such gas to flow into a pressure equalization zone, to depressure the adsorption zone to the desired desorption pressure, subsequently to pass the gas stored in the pressure equalization zone through the adsorption zone in order to wash the latter zone, and to dispose of the gas passed through the adsorption zone. The disadvantage of the known process is that though the gas is used to wash the adsorption zone, the valuable components in the gas are disposed of, thereby lowering the efficiency of the pressure swing adsorption process. U.S. Pat. Nos. 3,430,418 and 3,564,816 describe pressure swing adsorption processes in which at least 4 adsorption zones are present and in which the gas of each adsorption zone is used to repressure the other adsorption zones. After such repressuring any excess pressure in the first adsorption zone is disposed of by venting the excess gas. The disadvantage of these processes resides in the requirement that at least four expensive adsorption zones must be present. Further, the processes do not provide for any use of the gas that is disposed of. An even more expensive process is proposed in U.S. Pat. No. 3,986,849 where a process is described requiring at least seven adsorption stages and at least three pressure equalization stages.

All the above U.S. Patents recognize that the pressure swing adsorption process is suitable for the purification of hydrogen. The hydrogen-containing gas mixture subjected to pressure swing adsorption is suitably derived from a steam reforming process employing a hydrocarbonaceous feedstock, such as natural gas or other light hydrocarbons. This process is well-known. Reference is made in this respect to U.S. Pat. No. 3,810,975 and German Patent Application No. 2,911,669. Said German application describes a steam reforming process in which the produced hydrogen-containing gas mixture is subjected to a pressure swing adsorption process and a residue gas from the pressure swing adsorption process is recycled to the steam reforming process to be combusted and provide part of the heat for the endothermic steam reforming process.

It is an object of the present invention to provide a pressure swing adsorption process that allows for further use of residue gas.

It is another object of the invention to provide for a pressure swing process wherein the efficiency of the purification is improved.

Still another object of the invention is to provide an inexpensive alternative to the presence of a significant number of adsorption stages.

A further object of the invention is the provision of a process for the manufacture of hydrogen with an improved efficiency.

SUMMARY OF THE INVENTION

The present invention therefore relates to a process for the separation of one or more gas components from a gas mixture by adsorption of such components at a high adsorption pressure and by desorption of such components at a lower desorption pressure, which process comprises the following steps:

a) introducing the gas mixture into a first adsorption zone filled with adsorbent at the adsorption pressure so that the desired gas components are adsorbed on the adsorbent and a product gas, substantially free from the gas components leaves the adsorption zone;

b) interrupting the flow of the gas mixture to the adsorption zone and starting to introduce the gas mixture into one of a number of other adsorption zones that has been pressurized to the adsorption pressure, to ensure a continuous flow of product gas;

c) allowing the pressure in the first adsorption zone to decrease to an intermediate level between the adsorption pressure and the desorption pressure by allowing residue gas retained in the adsorption zone to flow to a residue gas vessel;

d) reducing the pressure in the first adsorption zone further to the desorption pressure by venting further residue gas from the first adsorption zone to a flare or vent stack, or by withdrawing further residue gas by means of a compressor, thereby achieving further desorption of the adsorbed gas components;

e) repressuring the first adsorption zone to the adsorption pressure;

f) interrupting the introduction of the gas mixture into one of the other adsorption zones and resuming such introduction into the first adsorption zone; and g) repeating steps b) to f).

The invention further relates to a process for the manufacture of hydrogen in which a methane-containing feedstock is converted into a hydrogen-containing gas mixture by a steam reforming reaction for which at least part of the required heat is provided by the combustion of a hydrogen-containing fuel gas, which process further comprises the following steps:

a) introducing the hydrogen-containing gas mixture into a first adsorption zone filled with adsorbent at the adsorption pressure so that the desired gas components are adsorbed on the adsorbent and hydrogen, substantially free from the gas components leaves the adsorption zone;

b) interrupting the flow of the gas mixture to the adsorption zone and starting to introduce the gas mixture into one of a number of other adsorption zones that has been pressurized to the adsorption pressure, to ensure a continuous flow of hydrogen;

c) allowing the pressure in the first adsorption zone to decrease to an intermediate level between the adsorption pressure and the desorption pressure by allowing residue gas retained in the adsorption zone to flow to a residue gas vessel;

d) reducing the pressure in the first adsorption zone further to the desorption pressure by venting further residue gas from the first adsorption zone to a flare or vent stack, or by withdrawing further residue gas by means of a compressor, thereby achieving further desorption of the adsorbed gas components;

e) repressuring the first adsorption zone to the adsorption pressure;

f) interrupting the introduction of the gas mixture into one of the other adsorption zones and resuming such introduction into the first adsorption zone;

g) repeating steps b) to f); and h) withdrawing a constant flow of residue gas during all steps a) to g) from the residue gas vessel in which the withdrawn residue gas is used as hydrogen-containing fuel gas to provide part of the heat for the steam reforming reaction.

DETAILED DESCRIPTION OF THE INVENTION

Since the process according to the present invention provides a residue gas vessel, it is possible to recover the value of this residue gas and use this gas for whatever purpose. The process further provides in step d) a further reduction of the pressure in the first adsorption zone so that the desorption pressure is reduced in a very inexpensive manner. It has been found that at a constant feed rate of the gas mixture to the process the efficiency of the product gas recovery is improved over using a residue gas vessel only.

Now that the efficiency of the process is improved the number of adsorption stages need not be very large. Evidently, the invention can be used in pressure swing adsorption processes comprising as many adsorption zones as desired, e.g. from 2 to 7. Preferably, the invention is applied to processes that comprise 2 or 3 adsorption zones. Such processes are relatively inexpensive as to required hardware, and the advantages of the present invention are most conspicuous in these processes.

When three or more adsorption zones are employed it is advantageous before the pressure in the first adsorption zone is reduced to the intermediate level by allowing residue gas to flow to the residue gas vessel, gas retained in the adsorption zone is allowed to flow to at least one other adsorption zones to equalize the pressures between the first and the said other adsorption zone or zones. Subsequently, the pressure in the first adsorption zone is further reduced by allowing residue gas to flow into the residue gas vessel. The amount of the residue gas to flow to the residue gas vessel can be regulated by means of compressors or the like. It is however preferred to decrease the pressure in the first adsorption zone by equalizing the pressures in the first adsorption zone and the residue gas vessel.

Then the pressure is allowed to drop to the desorption pressure value by venting further residue gas or withdrawing it by means of a compressor. Advantageously, the pressure is then reduced to substantially atmospheric pressure. In the case when a compressor is used the further residue gas is passed to a storage vessel from which it can be withdrawn for whatever purpose. When the instant process is used for hydrogen manufacture the further residue gas usually contains minor amounts of hydrogen together with some carbon monoxide and lower hydrocarbons, especially methane, and can therefore be used as low-BTU fuel gas. The use of a compressor and storage vessel is particularly desirable when the further residue gas represents a considerable value.

Since in an amount of cases the costs of a compressor and storage vessel will outweigh the benefits of the recovered residue gas, it is preferred to vent the further residue gas to a flare or vent stack. It will be evident that a flare is useful when the residue gas is combustible. The further residue gas may be directly vented if it does not contain noxious gas components. If it does, purification may be desirable or even required.

When the pressure is at the low value of the desorption pressure, the first adsorption zone is preferably washed with a purge gas which consists of relatively pure product gas. Thereby more of the gas components are desorbed from the adsorbent and are passed to the residue gas vessel. For that purpose a purge vessel may be provided. The set-up may be similar to the one described in U.S. Pat. No. 3,142,547. The purge gas in the purge vessel is preferably provided by the equalization of pressures in the first adsorption zone and the purge vessel between steps b) and c), i.e. immediately before the pressure in the first adsorption zone is allowed to drop to the intermediate level.

Repressuring of the first adsorption zone is preferably accomplished by first allowing gas retained in one of the other adsorption zones in which a higher pressure prevails, to flow into the first adsorption zone. After equalization between these two adsorption zones the pressure may be further increased by allowing equalization of pressure between the first adsorption zone and a further adsorption zone in which a still higher pressure is present. When three adsorption zones are employed in the present process, the first adsorption zone is preferably partly repressured by allowing gas retained in one of the other adsorption zones in which the adsorption pressure prevails, to flow into the first adsorption zone.

The pressure swing adsorption process according to the present invention can be operated at a wide range of adsorption and desorption pressures. The pressures selected may depend to an extent on the cycle time of the adsorption/desorption, on the actual gas mixture treated, the adsorbents used, and the temperatures prevailing in the process and mechanical design features, e.g. the size of the adsorption zones. It is emphasized that it is within the range of the skilled artisan to determine the optimum values for his case. Examplary values are those mentioned in the prior art: an adsorption pressure of up to about 600 psig (41.4 bar effective pressure), a desorption pressure from 0 to about 50 psig (up to 3.4 bar effective pressure). Cycle times from 10 seconds to 40 minutes have been mentioned. Suitable temperatures usually range from ambient to about 400° F. (204° C.).

The process according to the present invention can be applied in the separation of various gases. The separation of air is a suitable example. However, the present process is especially suitable for use in the purification of crude hydrogen. Therefore the invention further provides a process for the separation of one or more gas components from a hydrogen-containing gas mixture by adsorption of such components at a high adsorption pressure and by desorption of such components at a lower desorption pressure, which process comprises the following steps:

a) introducing the hydrogen-containing gas mixture into a first adsorption zone filled with adsorbent at the adsorption pressure so that the desired gas components are adsorbed on the adsorbent and hydrogen, substantially free from the gas components leaves the adsorption zone;

b) interrupting the flow of the gas mixture to the adsorption zone and starting to introduce the gas mixture into one of a number of other adsorption zones that has been pressurized to the adsorption pressure, to ensure a continuous flow of hydrogen;

c) allowing the pressure in the first adsorption zone to decrease to an intermediate level between the adsorption pressure and the desorption pressure by allowing residue gas retained in the adsorption zone to flow to a residue gas vessel;

d) reducing the pressure in the first adsorption zone further to the desorption pressure by venting further residue gas from the first adsorption zone to a flare or vent stack, or by withdrawing further residue gas by means of a compressor, thereby achieving further desorption of the adsorbed gas components;

e) repressuring the first adsorption zone to the adsorption pressure;

f) interrupting the introduction of the gas mixture into one of the other adsorption zones and resuming such introduction into the first adsorption zone; and g) repeating steps b) to f).

In the purification of crude hydrogen, the components that are desired to be removed usually include nitrogen, carbon monoxide, carbon dioxide, methane and water. It is known in the art what adsorbents are suitable for use in such purification. Suitable adsorbents include molecular sieves, e.g. calcium zeolite A, activated carbon, and activated alumina.

Steam reforming for the production of hydrogen is well known in the art. In this process a hydrocarbonaceous compound is subjected to a reaction with steam to yield mainly hydrogen and carbon dioxide. Suitable hydrocarbonaceous compounds include naphtha, LPG and gaseous hydrocarbons. The most suitable compounds comprise methane. Therefore the steam reforming of natural gas is widely applied. Reaction conditions usually comprise a pressure from 2 to 100 bar, preferably from 5 to 40 bar, and a temperature from 500° to 1600° C., preferably from 600° to 1100° C. The reaction is generally carried out in the presence of a catalyst. Suitable catalysts include Group VIII metals on a carrier, such as alumina, silica or mixtures thereof. A very suitable catalyst comprises nickel on alumina. Since such catalysts tend to be sensitive towards sulfur compounds the methane-containing feedstock is generally subjected to desulfurization before being subjected to the actual steam reforming reaction. Further information may be found in Kirk-Othmer's Encyclopedia of Chemical Technology, Wiley, N.Y., 3rd Ed., 1978, Vol. 12, pages 951 ff. As stated before, the crude hydrogen obtained by the steam reforming reaction usually contains in addition to hydrogen, some carbon monoxide. The content of carbon monoxide can conveniently be reduced in favor of an increased hydrogen content by a CO-shift reaction as is well known in the art. The Kirk-Othmer reference, U.S. Pat. No. 3,810,975 and the German Patent Application No. 2,911,669 include a description of a CO-shift reaction in connection with hydrogen production.

When residue gas from a process for the purification of crude hydrogen is used as fuel for the steam reforming reaction preceding the pressure swing adsorption process, it has to be borne in mind that the steam reforming reaction requires that a constant flow of fuel gas is withdrawn from the residue gas vessel. From the nature of the pressure swing adsorption process it is apparent that the pressure in the residue gas vessel varies considerably in accordance with the surges of residue gas flowing into the residue gas vessel. It is an accomplishment of the present invention that an inexpensive process has been found that on the one hand allows for such a constant withdrawal of fuel gas and on the other hand provides a lowering of the desorption pressure to substantially atmospheric, thereby increasing the efficiency of the adsorption process.

DETAILED DESCRIPTION OF THE DRAWINGS

Figure 1:
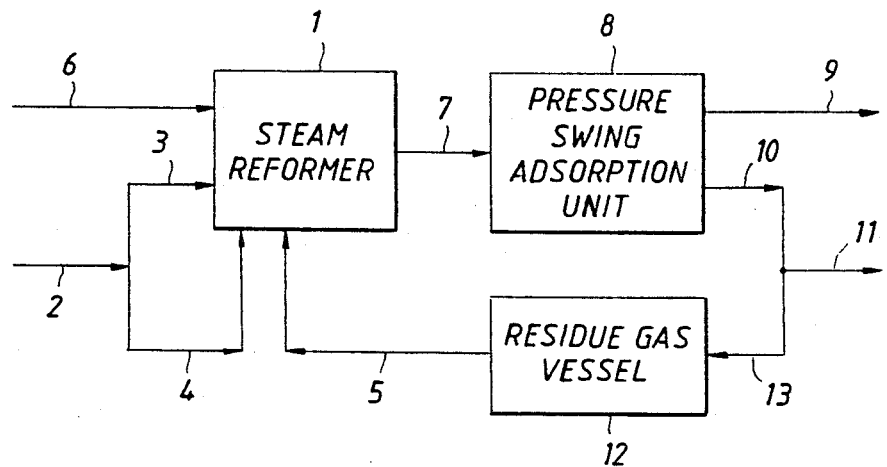
FIG. 1 shows schematically a flow diagram of a hydrogen production unit using the invention.

FIG. 1 shows a steam/methane reformer 1. The block 1 includes the actual steam reformer and CO-shift converters. Natural gas is supplied via a line 2, which splits into a line 3 containing the natural gas to be converted to hydrogen and a line 4 containing natural gas to be combusted to provide part of the heat required for the steam reforming reaction. The supplemental heat is provided by the combustion of a fuel gas supplied via a line 5. Steam is introduced into the steam reformer 1 via a line 6. From the steam reformer 1 a flow of crude hydrogen is withdrawn via a line 7. The crude hydrogen is purified in a pressure swing adsorption unit indicated by block 8 from which a pure hydrogen product gas is withdrawn via a line 9 and a residue gas containing hydrogen, carbon monoxide, carbon dioxide, methane and water via a line 10. In accordance with the present invention some of the residue gas is vented via a line 11 and the remainder is passed to a residue gas vessel 12 via line 13. From the residue gas vessel 12 a constant flow of residue gas is withdrawn via line 5 to be combusted and to provide heat for the steam reforming reaction.

Figure 2:
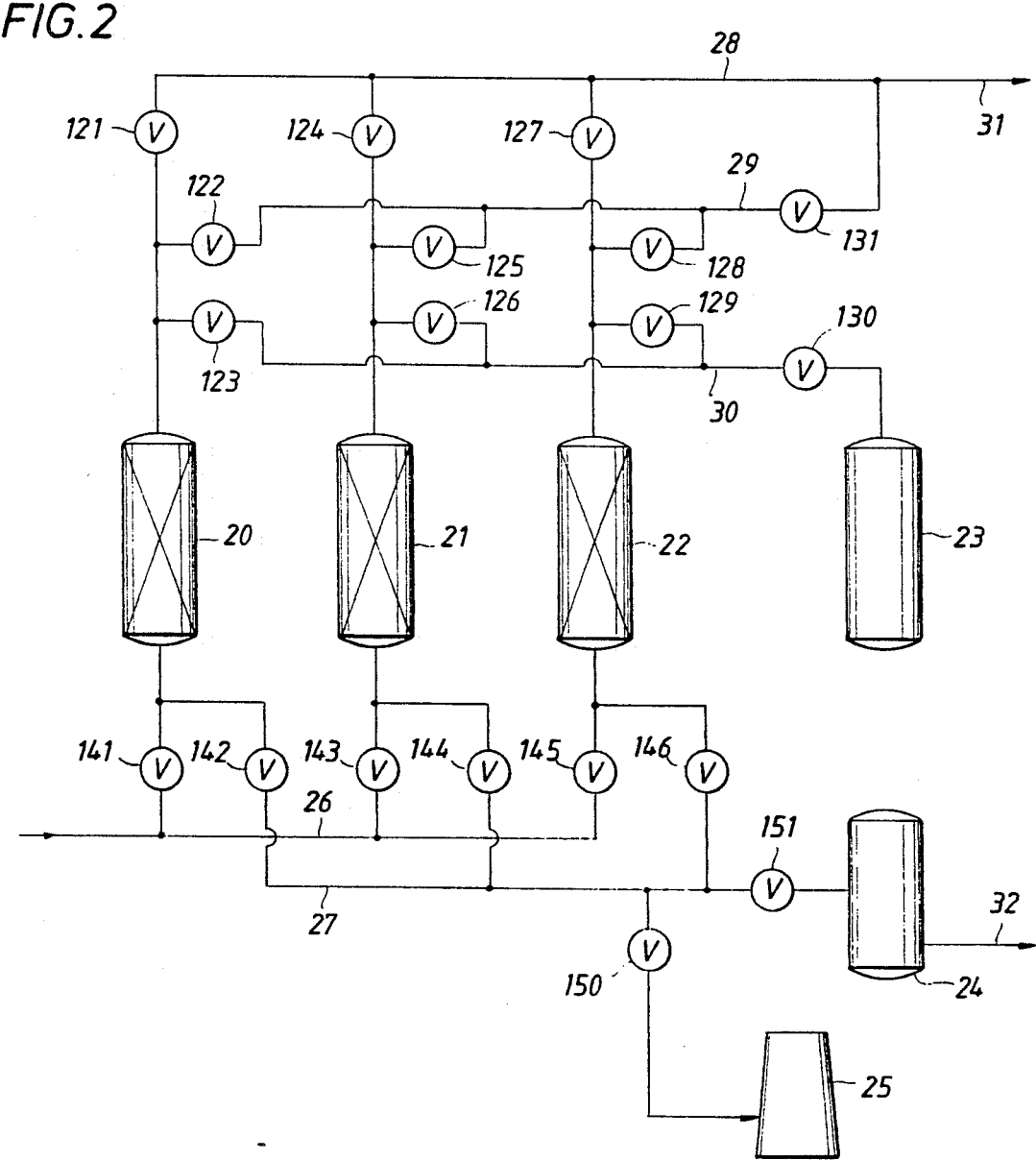
FIG. 2 shows a pressure swing adsorption process employing three adsorption zones.

The operation of the pressure swing adsorption process is elucidated by means of FIG. 2, showing three adsorption zones 20, 21 and 22. The plant further comprises a purge vessel 23, a residue gas vessel 24, and a flare 25. It will be evident that instead of a flare also a stack or a combination of a compressor and a storage vessel could be employed. The gas transport is provided for via a crude hydrogen manifold 26, a residue gas manifold 27, a pure hydrogen manifold 28, a repressure manifold 29 and a purge manifold 30. The lines to the manifolds have been provided with valves 121-131, 141-146, 150, 151. The three adsorption zones have been filled with activated carbon (⅔), molecular sieve (¼) and a small amount of alumina. At the beginning of a cycle adsorption zone 21 has just finished its turn on line and is starting to depressure. Adsorption zone 22 has been repressured and starts its turn on line. Adsorption zone 20 has just been depressured and purged and starts to be repressured. Adsorption zone 21 depressures overhead to adsorption zone 20 via the purge manifold 30 by opening valves 126 and 123. After equalization of the pressures between adsorption zones 21 and 20 valves 123 and 126 are closed and the repressuring of adsorption zone 20 is continued via a recycle of pure hydrogen supplied via the repress manifold 29 by opening valves 131 and 122. Simultaneously, the pressure in adsorption zone 21 is further decreased by depressurizing overhead to the purge vessel 23 via valves 126 and 130 until the pressures in adsorption zone 21 and purge vessel 23 equalize. Then, valves 126 and 130 are closed and the pressure in adsorption zone 21 is further decreased to the intermediate level by allowing residue gas to flow to the residue gas vessel 24 via the residue gas manifold 27 and valves 144 and 151. When the pressures in the adsorption zone 21 and the residue gas vessel 24 have about equalized valve 151 is closed and valve 150 is opened so that the residue gas is sent to the flare 25 and the pressure in the adsorption zone 21 decreases to substantially atmospheric value. Then valves 130 and 126 are quickly opened and a purge of gas high in hydrogen is passed from the purge vessel 23 to the adsorption zone 21 via the purge manifold 30. Since valve 150 is still open this purge does not have an increasing effect on the pressure in adsorption zone 21. When the purge gas reaches the bottom of the adsorption zone 21 the valves 150 closes. Since the valves 130, 126 and 144 are still open the pressure in the adsorption zone 21 increases. When the pressure reaches the value of the pressure in the residue gas vessel 24, valve 151 is opened and the mixture of desorbed gas components is stored in the residue gas vessel 24 by the pressure equalization in vessels 23, 21 and 24. Subsequently, valves 130, 126, 144 and 151 are closed and the end of a cycle is reached. During this cycle adsorption zone 22 is purifying crude hydrogen supplied via the crude hydrogen manifold 26 and through valve 145 to produce pure hydrogen recovered via line 31, and a constant flow of residue gas is withdrawn from the residue gas vessel 24 via a line 32 for use as fuel gas for the steam reformer. Now the valves 145 and 127 can be closed and the cycle can be repeated with adsorption zone 20 as the purifying zone, adsorption zone 21 as the zone that needs repressuring and adsorption zone 22 that is to be depressured and purged.

EXAMPLE

To show the improved efficiency of the process according to the present invention a comparison is made between the operation of a hydrogen production unit without a vent and the operation of such a unit operated in accordance with the description of FIG. 2.

The steam reformer was fed at a rate of 655 scfm (309 Nl/s) of natural gas. The adsorption pressure applied was 200 psig (13.79 bar effective pressure). The hydrogen-containing gas mixture that was obtained from the steam reformer, contained about 75% vol $H_2$, the remaining 25% vol consisting of $CO_2$, CO, $CH_4$ and some $H_2O$, and was fed to the pressure swing adsorption unit at a temperature of 90° F. The purity of the hydrogen obtained was over 99.9% vol.

First, the unit was operated without a vent. The lowest possible desorption pressure was about 15 psig (1.03 bar effective pressure). The production rate of pure hydrogen was monitored and averaged out. In this first operation the average pure hydrogen production rate amounted to 1620 scfm (764.5 Nl/s).

After the unit was provided with a vent, the operation was carried out as described above. The desorption pressure reached in this case was below 3 psig (0.21 bar effective pressure). After the unit has stabilized, the average hydrogen production rate was again determined and found to be above 1840 scfm (868.4 Nl/s) at the same purity, which boils down to an improvement by about 14%.

Evidently, the amount of residue gas that was fed to the steam reformer as fuel gas dropped (viz. from over 1200 scfm (566.3 Nl/s) to 815 scfm (384.6 Nl/s)). This drop in fuel gas was made up for by an additional amount of natural gas that was fed to the steam reformer (viz. from about 120 scfm (56.6 Nl/s) to about 230 scfm (108.5 Nl/s)). Surprisingly enough that meant that despite the fact that some hydrogen-containing gas was vented, the ratio of the total amount of natural gas supplied to the unit and the total amount of hydrogen recovered was substantially constant, viz. $H_2/CH_4$ was about 2.1. That implies that the present process enables the production of more hydrogen without any major investment without suffering any loss in yield.

What is claimed is:

1. Process for the separation of one or more gas components from a hydrogen-containing gas mixture by adsorption of such components at a high adsorption pressure and by desorption of such components at a lower desorption pressure, which process comprises the following steps:
   a) introducing the hydrogen-containing gas mixture into a first adsorption zone filled with adsorbent at the adsorption pressure so that the desired gas components are adsorbed on the adsorbent and hydrogen, substantially free from the other gas components, leaves the adsorption zone;
   b) interrupting the flow of the gas mixture to the adsorption zone and starting to introduce the gas mixture into one of a number of other adsorption zones that have been pressurized to the adsorption pressure, to ensure a continuous flow of hydrogen;
   c) decreasing the pressure in the first adsorption zone by allowing the gas relatively high in hydrogen content to flow to a purge vessel until the pressures in the adsorber and purge vessel are equalized;
   d) allowing the prssure in the first adsorption zone to further decrease to an intermediate level between the adsorption pressure and the desorption pressure by allowing residue gas retained in the first adsorption zone to flow from the first adsorption zone to a residue gas vessel;
   e) reducing the pressure in the first adsorption zone still further to the desorption pressure by venting further residue gas from the first adsorption zone to a flare or vent stack, or by withdrawing further residue gas by means of a compressor, thereby achieving further desorption of the adsorbed gas components;

f) allowing the gas from the purge vessel to flow back through the first adsorption zone thereby completing desorption of the adsorbed gas components;

g) repressuring the first adsorption zone to the adsorption pressure by allowing gas retained in one of the other adsorptin zones in which a higher pressure prevails to flow into the first adsorption zone;

h) interrupting the introduction of the gas mixture into one of the other adsorption zones and resuming such introduction into the first adsorption zone; and i) repeating steps b) to h).

2. Process as claimed in claim 1, in which the total number of adsorption zones ranges from 2 to 7.

3. Process as claimed in claim 2, in which the total number of adsorption zones is 2 or 3.

4. Process as claimed in claim 1, in which before the pressure in the first adsorption zone is reduced to the intermediate level by allowing residue gas to flow to the residue gas vessel, residue gas retained in the adsorption zone is allowed to flow to at least one other adsorption zone to equalize the pressures between the first and the said other adsorption zone or zones.

5. Process as claimed in claim 1, in which the pressure in the first adsorption zone is decreased by equalizing the pressures in the first adsorption zone and the residue gas vessel.

6. Process as claimed in claim 1, in which pressure in the first adsorption zone is reduced to substantially atmospheric pressure by venting the residue gas to a flare or vent stack.

7. Process for the manufacture of hydrogen in which a methane-containing feedstock is converted into a hydrogen-containing gas mixture by a steam reforming reaction for which at least part of the required heat is provided by the combustion of a hydrogen-containing fuel gas, which process further comprises the following steps:

a) introducing the hydrogen-containing gas mixture into a first adsorption zone filled with adsorbent at the adsorption pressure so that the desired gas components are adsorbed on the adsorbent and hydrogen, substantially free from the gas components leaves the adsorption zone;

b) interrupting the flow of the gas mixture to the adsorption zone and starting to introduce the gas mixture into one of a number of other adsorption zones that has been pressurized to the adsorption pressure, to ensure a continuous flow of hydrogen;

c) allowing the pressure in the first adsorption zone to decrease to an intermediate level between the adsorption pressure and the desorption pressure by allowing residue gas retained in the adsorption zone to flow to a residue gas vessel;

d) reducing the pressure in the first adsorption zone further to the desorption pressure by venting further residue gas from the first adsorption zone to a flare or vent stack, or by withdrawing further residue gas by means of a compressor, thereby achieving further desorption of the adsorbed gas components;

e) repressuring the first adsorption zone to the adsorption pressure;

f) interrupting the introduction of the gas mixture into one of the other adsorption zones and resuming such introduction into the first adsorption zone;

g) repeating steps b) to f); and h) withdrawing a constant flow of residue gas during all steps a) to g) from the residue gas vessel in which the withdrawn residue gas is used as hydrogen-containing fuel gas to provide part of the heat for the steam reforming reaction.

* * * * *